United States Patent
Li et al.

(10) Patent No.: US 11,652,660 B2
(45) Date of Patent: May 16, 2023

(54) OPTICAL LINE TERMINAL AND DATA TRANSMISSION METHOD, SYSTEM, AND APPARATUS

(71) Applicant: HUAWEI TECHNOLOGIES CO., LTD., Shenzhen (CN)

(72) Inventors: Weiguo Li, Dongguan (CN); Haitao Hu, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/528,906

(22) Filed: Nov. 17, 2021

(65) Prior Publication Data

US 2022/0078041 A1 Mar. 10, 2022

Related U.S. Application Data

(63) Continuation of application No. PCT/CN2020/071700, filed on Jan. 13, 2020.

(30) Foreign Application Priority Data

May 31, 2019 (CN) .......................... 201910469620.2

(51) Int. Cl.
*H04L 12/28* (2006.01)
(52) U.S. Cl.
CPC ................ *H04L 12/2885* (2013.01)
(58) Field of Classification Search
CPC ............ H04L 12/2885; H04L 41/0226; H04Q 11/0067
See application file for complete search history.

(56) References Cited

U.S. PATENT DOCUMENTS 8,127,042 B1 * 2/2012 Davis .................. H04Q 3/0083
709/227
8,144,594 B2 * 3/2012 Woundy ................. H04L 47/12
370/231

(Continued)

FOREIGN PATENT DOCUMENTS

| CN | 1929394 A | 3/2007 |
| CN | 101043275 A | 9/2007 |

(Continued)

OTHER PUBLICATIONS

ETSI ES 203 259 V1.1.1 (Jan. 2015), "Integrated broadband cable telecommunication networks (Cable); Converged Cable Access Platform; Operational Support System Interface", ETSI Standard, total 418 pages.

(Continued)

*Primary Examiner* — Mohamed A. Wasel
(74) *Attorney, Agent, or Firm* — Maier & Maier, PLLC

(57) ABSTRACT

A data transmission method includes an optical line terminal (OLT) for obtaining a data template. The OLT then obtains corresponding optical network terminal (ONT) data based on one or more data types defined in the data template. The OLT then encodes the ONT data according to an external data representation (XDR) format and sends encoded ONT data to a management server. Further, the management server stores and manages the ONT data. The OLT collects the corresponding ONT data based on the data template, encodes and reports the ONT data according to the uniform XDR format. The embodiments define a unified statistics collecting and reporting manner of ONT data and uses standardly defined ONT data to help the management server store and manage the ONT data.

18 Claims, 5 Drawing Sheets

(56) References Cited

U.S. PATENT DOCUMENTS

| | | | |
|---|---|---|---|
| 8,831,425 B1* | 9/2014 | Bernstein | H04B 10/27 398/71 |
| 9,270,480 B1* | 2/2016 | Som de Cerff | H04L 41/344 |
| 10,355,926 B2* | 7/2019 | Wan | H04L 41/0813 |
| 10,356,496 B2* | 7/2019 | Roe | H04Q 11/0067 |
| 2008/0232801 A1 | 9/2008 | Arnold et al. | |
| 2009/0238561 A1* | 9/2009 | Huang | H04B 10/0793 398/25 |
| 2010/0196006 A1* | 8/2010 | Lin | H04Q 11/0067 398/58 |
| 2013/0174186 A1 | 7/2013 | Kelsen et al. | |
| 2017/0187460 A1* | 6/2017 | Bernstein | H04B 10/2575 |
| 2019/0207833 A1* | 7/2019 | Viana | H04L 12/4625 |

FOREIGN PATENT DOCUMENTS

| | | |
|---|---|---|
| CN | 101179433 A | 5/2008 |
| CN | 101272213 A | 9/2008 |
| CN | 101815008 A | 8/2010 |
| CN | 102104420 A | 6/2011 |
| CN | 102546612 A | 7/2012 |
| CN | 103167363 A | 6/2013 |
| CN | 104536700 A | 4/2015 |
| CN | 105007180 A | 10/2015 |
| CN | 105208575 A | 12/2015 |
| CN | 106911437 A | 6/2017 |
| CN | 107193909 A | 9/2017 |
| CN | 107454579 A | 12/2017 |
| WO | 2012089708 A1 | 7/2012 |
| WO | 2016131413 A1 | 8/2016 |
| WO | 2017113349 A1 | 7/2017 |

OTHER PUBLICATIONS

Xiquan, "Computer Network and Communication", Data Representation Formatting, 2004, 4 pages (with English abstract).

* cited by examiner

OPTICAL LINE TERMINAL AND DATA TRANSMISSION METHOD, SYSTEM, AND APPARATUS

CROSS-REFERENCE TO RELATED APPLICATIONS

This application is a continuation of International Application No. PCT/CN2020/071700, filed on Jan. 13, 2020, which claims priority to Chinese Patent Application No. 201910469620.2, filed on May 31, 2019. The disclosures of the aforementioned applications are hereby incorporated by reference in their entireties.

TECHNICAL FIELD

The embodiments relate to the access network communications field, and in particular, to a data transmission method and a related device.

BACKGROUND

In a distributed converged cable access platform (D-CCAP) scenario, an Internet protocol detail record (IPDR) may provide a statistics collecting and reporting mechanism and statistics information that are defined in a data over cable service interface specification (DOCSIS) standard.

As copper access evolves to optical access, as a typical solution of a multiple system operator (MSO), a hybrid networking scenario of a passive optical network (PON) and a D-CCAP has been widely applied. According to a definition of the IPDR, a CMTS device may send collected CM data to an IPDR server. However, a statistics collecting and reporting manner of ONT data lacks a uniform standard.

SUMMARY

Embodiments provide a data transmission method and a related device, to reduce power consumption of a management server configured to manage optical network terminal (ONT) data.

In view of this, a first aspect of the embodiments provides a data transmission method, including:

An optical line terminal (OLT) obtains a data template; then the OLT may obtain corresponding ONT data based on one or more data types defined in the data template; and then the OLT encodes the ONT data according to an external data representation (XDR) format and sends encoded ONT data to a management server; and the management server stores and manages the ONT data.

A second aspect of the embodiments provides an OLT, including:

a first obtaining unit, configured to obtain a data template, where the data template indicates at least two data types associated with an optical network terminal (ONT);

a second obtaining unit, configured to obtain ONT data based on the data template;

an encoding unit, configured to encode the ONT data according to external data representation (XDR); and a sending unit, configured to send encoded ONT data to a management server.

A third aspect of the embodiments provides an OLT, including:

a processor and a memory, where the memory stores program code; and when invoking the program code in the memory, the processor performs the process of any implementation in the first aspect.

A fourth aspect of the embodiments of the embodiments provides a computer-readable storage medium, including instructions. When the instructions are run on a computer, the computer is enabled to perform the processes in the data transmission method according to the first aspect.

A fifth aspect of the embodiments of the embodiments provides a computer program product including instructions. When the computer program product runs on a computer, the computer is enabled to perform the processes in the data transmission method according to the first aspect.

DETAILED DESCRIPTION OF THE EMBODIMENTS

Embodiments provide a data transmission method and a related device, to reduce power consumption of a management server configured to manage ONT data.

Current broadband access technologies are mainly categorized into copper access technologies (for example, various DSL technologies) and optical access technologies. The copper access technology may include various digital subscriber line (DSL) technologies. An access network implemented by using the optical access technology is referred to as an optical access network (OAN).

A passive optical network (PON) is an implementation technology of the optical access network, and the PON is an optical access technology of point-to-multipoint transmission.

The embodiments provide an ONT data collection process applied to a PON scenario or a hybrid networking scenario of a PON and a D-CCAP. The following separately describes the data transmission method in the embodiments with reference to the two scenarios.

First scenario: PON scenario.

Figure 1:
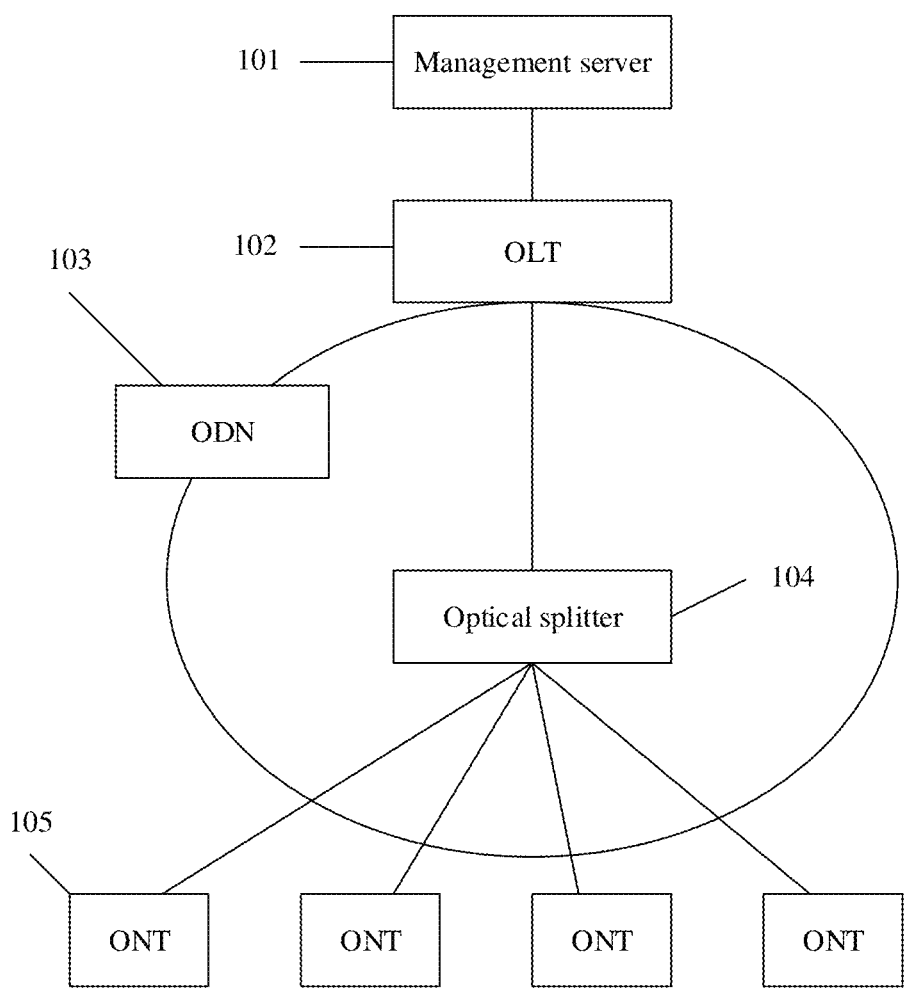
FIG. 1 is a schematic diagram of a network structure of a PON scenario.

FIG. 1 is a diagram of a system architecture applied to the PON scenario according to an embodiment of this application.

An optical line terminal (OLT) (102) is configured to provide a network side interface for an OAN. The OLT (102) is connected to an upper-layer management server (101) and is connected to one or more optical distribution networks (ODN) (103) at a lower layer.

The ODN (103) includes an optical splitter (104) configured to split optical power, a feeder fiber connected between the optical splitter (104) and the OLT (102), and distribution fibers connected between the optical splitter (104) and optical network terminals (optical network terminal, ONT) (105). During downlink data transmission, the ODN (103) transmits downlink data of the OLT (102) to the ONTs (105) by using the optical splitter (104). Likewise, during uplink data transmission, the ODN (103) converges uplink data of the ONTs (105) and then transmits converged uplink data to the OLT (102). The ONT (105) provides a user side interface for the OAN and is also connected to the ODN (103).

It should be noted that the management server (101) in this embodiment is dedicated to storing and managing ONT data. The management server (101) may be a network management device that performs a network management task such as network planning or network monitoring. For example, the ONTs (105) may report ONT data to the OLT (102) by using the ODN (103); the OLT (102) encodes the collected ONT data in a uniform format and then sends encoded ONT data to the management server (101); and the management server (101) stores and manages the ONT data.

Figure 2:
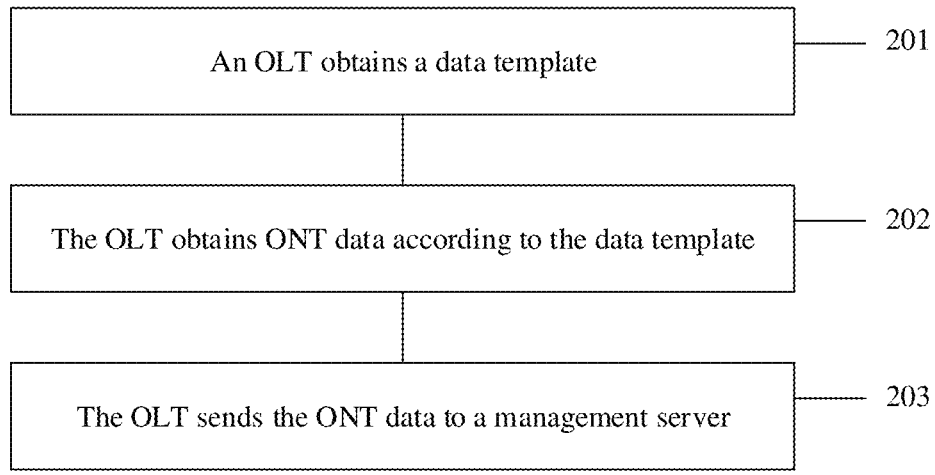
FIG. 2 is a schematic diagram of an embodiment of a data transmission method according to the embodiments.

For ease of understanding, the following describes a specific process in the embodiments in detail. Refer to FIG. 2. An embodiment of the data transmission method includes the following steps.

201. An OLT obtains a data template.

In this embodiment, the OLT may receive the data template sent by a management server. The data template may indicate at least two data types associated with an ONT. It should be noted that the OLT may alternatively obtain the data template in another manner, for example, by preconfiguring the data template. This is not limited herein. For the ONT data types in the data template, refer to Table 1.

TABLE 1

| ONT data type | Character data type | Data length | XDR object | Data record |
| --- | --- | --- | --- | --- |
| MAC address of the ONT | UCHAR | 6 | ipdr: macAddress | |
| Online status of the ONT | UCHAR | 1 | Integer | |
| Last registration time of the ONT | uint64 | 8 | dateTime | |
| Identifier of an ONT service flow | ULONG | 4 | unsignedInt | |
| Traffic template of the ONT service flow | UCHAR | 15 + 1 | string | |
| Direction of the ONT service flow | UCHAR | 1 | Integer | |
| Quantity of forwarded bytes of the ONT service flow | 64ULONG | 8 | unsignedLong | |
| Quantity of forwarded packets of the ONT service flow | 64ULONG | 8 | unsignedLong | |
| Quantity of discarded packets of the ONT service flow | ULONG | 4 | unsignedInt | |
| OLT device name | UCHAR | 50 | string | |
| OLT start time | UINT | 4 | unsignedInt | |

It can be seen from Table 1 that, the data template includes at least two of the media access control (MAC) address of the ONT, the online status of the ONT, the last registration time of the ONT, the identifier of the ONT service flow, the traffic template of the ONT service flow, the direction of the ONT service flow, the quantity of forwarded bytes of the ONT service flow, the quantity of forwarded packets of the ONT service flow, and the quantity of discarded packets of the ONT service flow. The data template may further include some information associated with the OLT, such as the OLT device name and the OLT start time.

It should be noted that the data template listed in Table 1 does not include all ONT data types in the embodiments. For details, refer to a definition of a CM data type in a current DOCSIS. That is, the ONT in the data template in this application corresponds to a CM in the DOCSIS standard. In addition to the ONT data types, the data template may further include other items corresponding to the ONT data types (for example, a character data type, a data length, and an XDR object that correspond to each type of ONT data). For details, refer to an IPDR data collection template defined in the DOCSIS. That is, parameters such as the character data type and the data length that correspond to the ONT data in the data template defined in this application may be consistent with parameters such as a character data type and a data length that correspond to CM data in the IPDR data collection template defined in the DOCSIS.

202. The OLT obtains ONT data based on the data template.

In this embodiment, one OLT may manage a plurality of ONTs. The OLT broadcasts a message to all the managed ONTs to request the ONTs to report ONT data, and then the ONTs send ONT data of the ONTs to the OLT by using a time division multiple access (TDMA) technology. For example, the OLT fills, based on the data template, ONT data corresponding to each data type.

203. The OLT sends the ONT data to the management server.

In this embodiment, after collecting the ONT data, the OLT may encode the ONT data in a uniform format, and then send encoded ONT data to the management server; and the management server stores and manages the ONT data. For example, an encoding manner may be external data representation (XDR). The OLT may jointly package ONT data filled in the data template and send packaged ONT data to the management server. Certainly, the OLT may alternatively send the ONT data to the management server in batches based on different requirements. This is not limited herein.

Optionally, the OLT may establish a connection to the management server in a plurality of manners, for example, in an active mode or a passive mode. This is not limited herein. The active mode means that the OLT actively initiates a connection request to the management server; and the management server listens to a status of a port connected to the OLT, and after receiving the request, the management server makes a response and establishes a connection. The passive mode means that the management server actively initiates a connection request to the OLT; and the OLT listens to a status of a port connected to the management server, and after receiving the request, the OLT makes a response and establishes a connection.

Optionally, the OLT may send the ONT data to the management server in a plurality of manners, for example, may periodically report the ONT data to the management server or report the ONT data to the management server at one time. This is not limited herein. The periodic reporting means that a statistics collecting period is configured for the OLT. When the statistics collecting period starts, the OLT may send a session start message to the management server, to identify start of data reporting of the statistics collecting period, and then the OLT sends collected ONT data to the management server. When the statistics collecting period ends, the OLT sends a session end message to the management server, to identify end of the data reporting of the statistics collecting period. It may be understood that the statistics collecting period may be delivered by the management server to the OLT or may be locally configured in the OLT. This is not limited herein. The one-time reporting means that the management server initiates a statistics collecting session, and then the OLT sends collected ONT data to the management server according to an indication of the statistics collecting session. The statistics collecting session may be a logical connection between the OLT and the management server, for completing data transmission and recording. There may be a plurality of statistics collecting sessions between the OLT and the management server, and different statistics collecting sessions are distinguished from each other by using session identifiers.

It should be noted that after receiving the ONT data sent by the OLT, the management server may locally store the ONT data, and forward the ONT data to an MSO background running system. The MSO background running system (such as an OSS or a BSS) may analyze the ONT data to meet a related requirement of an operator, such as charging.

In this embodiment, the OLT obtains the data template; then the OLT may obtain the corresponding ONT data based on one or more data types defined in the data template; and then the OLT encodes the ONT data according to an XDR format and sends the encoded ONT data to the management server; and the management server stores and manages the ONT data. According to the foregoing description, the OLT collects the corresponding ONT data based on the data template and encodes and reports the ONT data according to the uniform XDR format. The embodiments define a unified statistics collecting and reporting manner of ONT data and uses standardly-defined ONT data, to help the management server store and manage the ONT data.

Second scenario: Hybrid networking scenario of a PON and a D-CCAP.

The foregoing describes the process in which the OLT sends the ONT data to the management server in the PON scenario. It may be understood that, as copper access evolves to optical access, as a typical solution of an MSO, the hybrid networking scenario of the PON and the D-CCAP has been widely applied.

Figure 3:
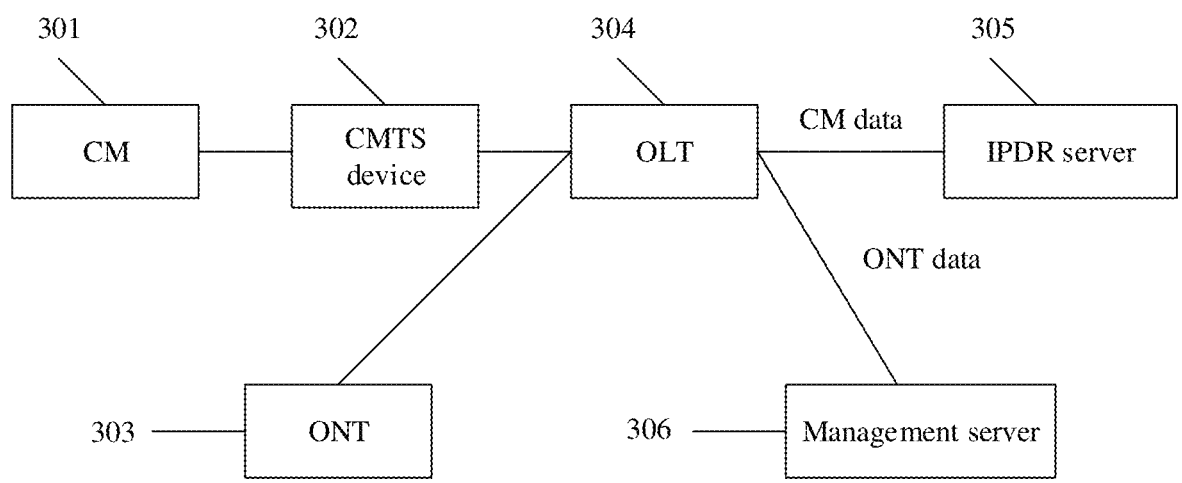
FIG. 3 is a schematic diagram of a network structure of a hybrid networking scenario of a PON and a D-CCAP.

FIG. 3 is a diagram of a system architecture applied to a hybrid networking scenario of a PON and a D-CCAP according to an embodiment.

The hybrid networking scenario of the PON and the D-CCAP may include a CM (301), a CMTS device (302), an ONT (303), an OLT (304), an IPDR server (305), and a management server (306). The CMTS device (302) is configured to: collect CM data from the CM (301), and encode the CM data and then send encoded CM data to the OLT (304), and the OLT (304) sends the encoded CM data to the IPDR server (305). The OLT (304) may collect ONT data from the ONT (303), and encode the ONT data and then send encoded ONT data to the management server (306). It can be understood that the IPDR server (305) and the management server (306) are respectively configured to manage the CM data and the ONT data.

In addition, in the hybrid networking scenario of the PON and the D-CCAP, the management server (306) may be the IPDR server (305), that is, the IPDR server is further configured to manage the ONT data in addition to the CM data. The management server (306) and the IPDR server (305) are no longer separated, so that network deployment costs can be reduced to a specific extent.

Therefore, the following describes an embodiment in which the management server (306) is the IPDR server (305) in the hybrid networking scenario of the PON and the D-CCAP.

Figure 4:
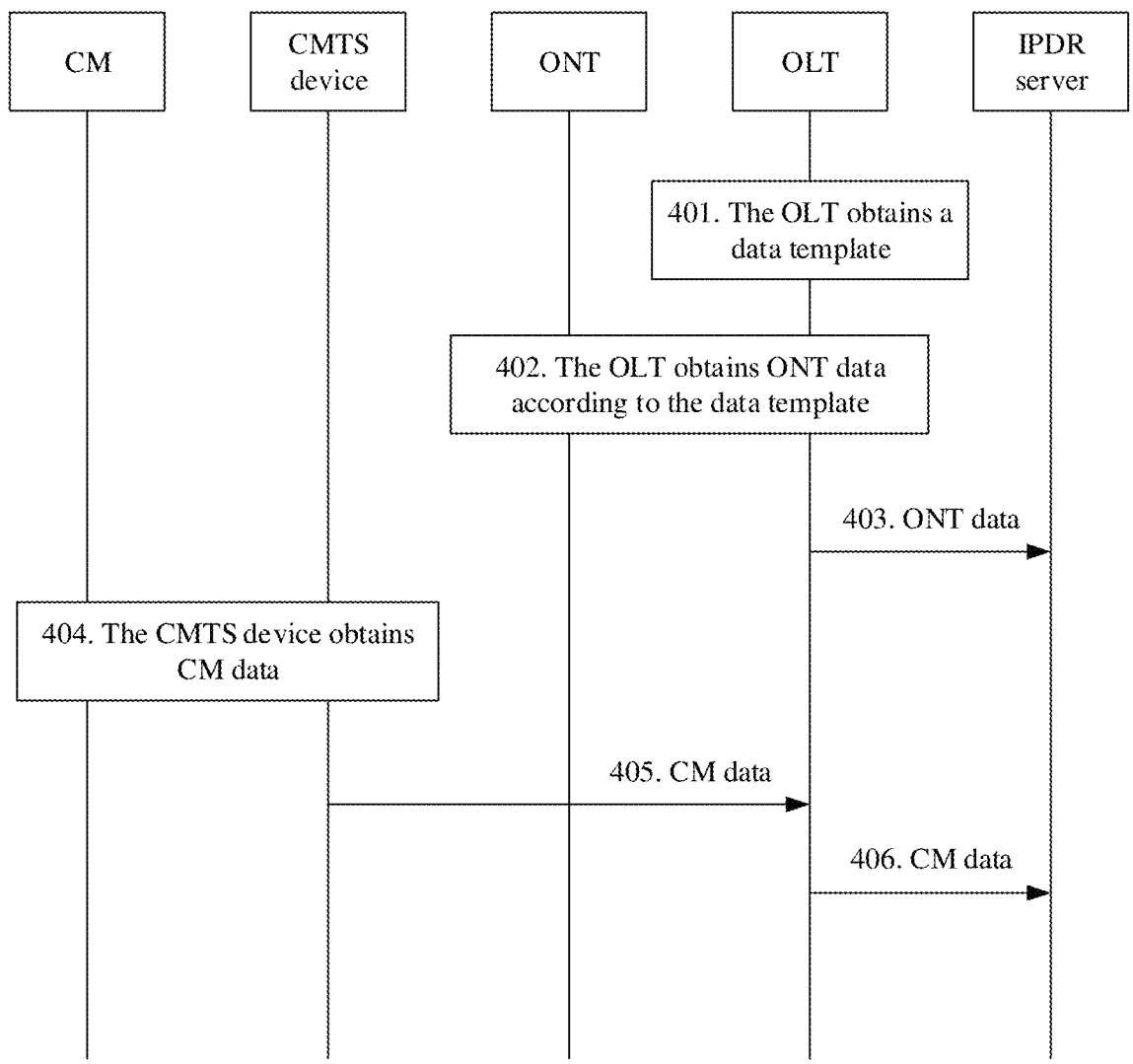
FIG. 4 is a schematic diagram of another embodiment of a data transmission method according to the embodiments.

Refer to FIG. 4. Another embodiment of the data transmission method in the embodiments includes the following steps.

401. An OLT obtains a data template.

402. The OLT obtains ONT data based on the data template.

403. The OLT sends the ONT data to an IPDR server.

In this embodiment, steps 401 to 403 are similar to steps 201 to 203 in the embodiment shown in FIG. 2. However, in the embodiment shown in FIG. 2, the management server interacts with the OLT, and in the embodiment shown in FIG. 4, the IPDR server interacts with the OLT. Details are not described herein.

404. A CMTS device obtains CM data.

In this embodiment, the CMTS device may collect the CM data in a manner defined in a DOCSIS standard. For example, the CMTS device may receive a data template that is about the CM data and that is sent by the IPDR server, and then the CMTS device collects the corresponding CM data based on the data template.

405. The CMTS device sends the CM data to the OLT.

In this embodiment, it can be understood from the network structure shown in FIG. 3 that the CMTS device is a cascaded device of the OLT, that is, data of the CMTS device needs to be reported by using the OLT. Therefore, the CMTS device needs to first send the collected CM data to the OLT. For example, the CMTS device may encode the CM data in a uniform format, and send encoded CM data to the OLT. An encoding manner may be XDR. It may be understood that the CM data and the ONT data are encoded in a same encoding manner.

It should be noted that, in the hybrid networking scenario of the PON and the D-CCAP, the CMTS device and the OLT may be devices independent of each other, or may be aggregated as an optical-copper integrated access device, that is, the CMTS device and the OLT device are externally virtualized as an independent access device to interact with the IPDR server. This is not limited herein.

406. The OLT sends the CM data to the IPDR server.

In this embodiment, the OLT may forward the received CM data to the IPDR server. It may be understood that, if the CMTS device does not encode the CM data in step 405, the OLT may alternatively encode the CM data after receiving the CM data. This is not limited herein.

It should be noted that there is no fixed time sequence relationship between steps 401 to 403 and steps 404 to 406. Steps 401 to 403 may be first performed, steps 404 to 406 may be first performed, or steps 401 to 403 and steps 404 to 406 may be simultaneously performed. This is not limited herein. In addition, the OLT may jointly package the CM data and the ONT data and send packaged data to the IPDR server or may separately package the CM data and the ONT data and send packaged CM data and packaged ONT data to the IPDR server. This is not limited herein.

In this embodiment, in the hybrid networking scenario of the PON and the D-CCAP, as a management server, the IPDR server may store and manage the CM data collected by the CMTS device and may further store and manage the ONT data collected by the OLT. The management server and the IPDR server are no longer separated. This reduces network deployment costs.

The data transmission method in the embodiments is described above, and the OLT in the embodiments is described below.

Figure 5:
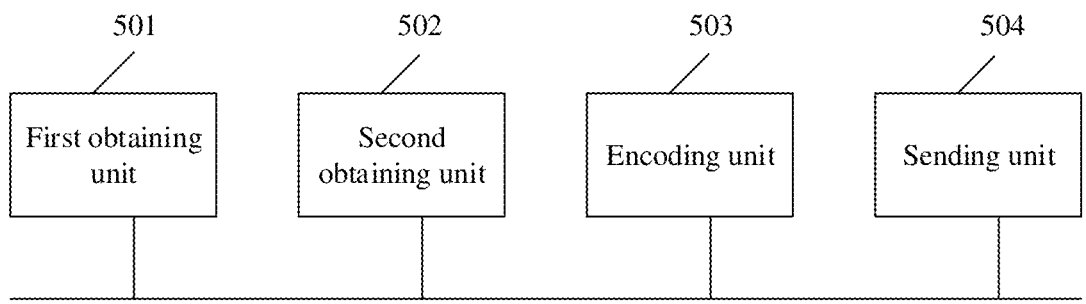
FIG. 5 is a schematic diagram of an embodiment of an OLT according to the embodiments.

Refer to FIG. 5. An embodiment of the OLT in the embodiments includes:

a first obtaining unit 501, configured to obtain a data template, where the data template indicates at least two data types associated with an optical network terminal (ONT);

a second obtaining unit 502, configured to obtain ONT data based on the data template;

an encoding unit 503, configured to encode the ONT data according to XDR; and a sending unit 504, configured to send encoded ONT data to a management server.

Optionally, the management server includes an IPDR server.

Optionally, the second obtaining unit 502 is further configured to:

receive CM data sent by a CMTS device.

The encoding unit 503 is further configured to:

encode the CM data according to the XDR.

The sending unit 504 is further configured to:

send encoded CM data to the IPDR server.

Optionally, the second obtaining unit 502 is further configured to:

receive CM data sent by a CMTS device, where the CM data is encoded by the CMTS device according to the XDR.

The sending unit 504 is further configured to:

send the encoded CM data to the IPDR server.

Optionally, the data template includes at least two of a MAC address of the ONT, an online status of the ONT, last registration time of the ONT, an identifier of an ONT service flow, a traffic template of the ONT service flow, a direction of the ONT service flow, a quantity of forwarded bytes of the ONT service flow, a quantity of forwarded packets of the ONT service flow, and a quantity of discarded packets of the ONT service flow.

Optionally, the first obtaining unit 501 is configured to:

receive the data template sent by the management server.

In this embodiment, the first obtaining unit 501 obtains the data template; then the second obtaining unit 502 obtains the ONT data based on the data template; then the encoding unit 503 encodes the ONT data according to an XDR format; and the sending unit 504 sends the encoded ONT data to the management server. According to the foregoing description, the OLT collects the corresponding ONT data based on the data template and encodes and reports the ONT data according to the uniform XDR format. The embodiments define a unified statistics collecting and reporting manner of ONT data and uses standardly-defined ONT data, to help the management server store and manage the ONT data.

The foregoing describes the OLT in the embodiments from a perspective of a modular functional entity. The following describes the OLT in the embodiments of this application from a perspective of hardware processing.

Figure 6:
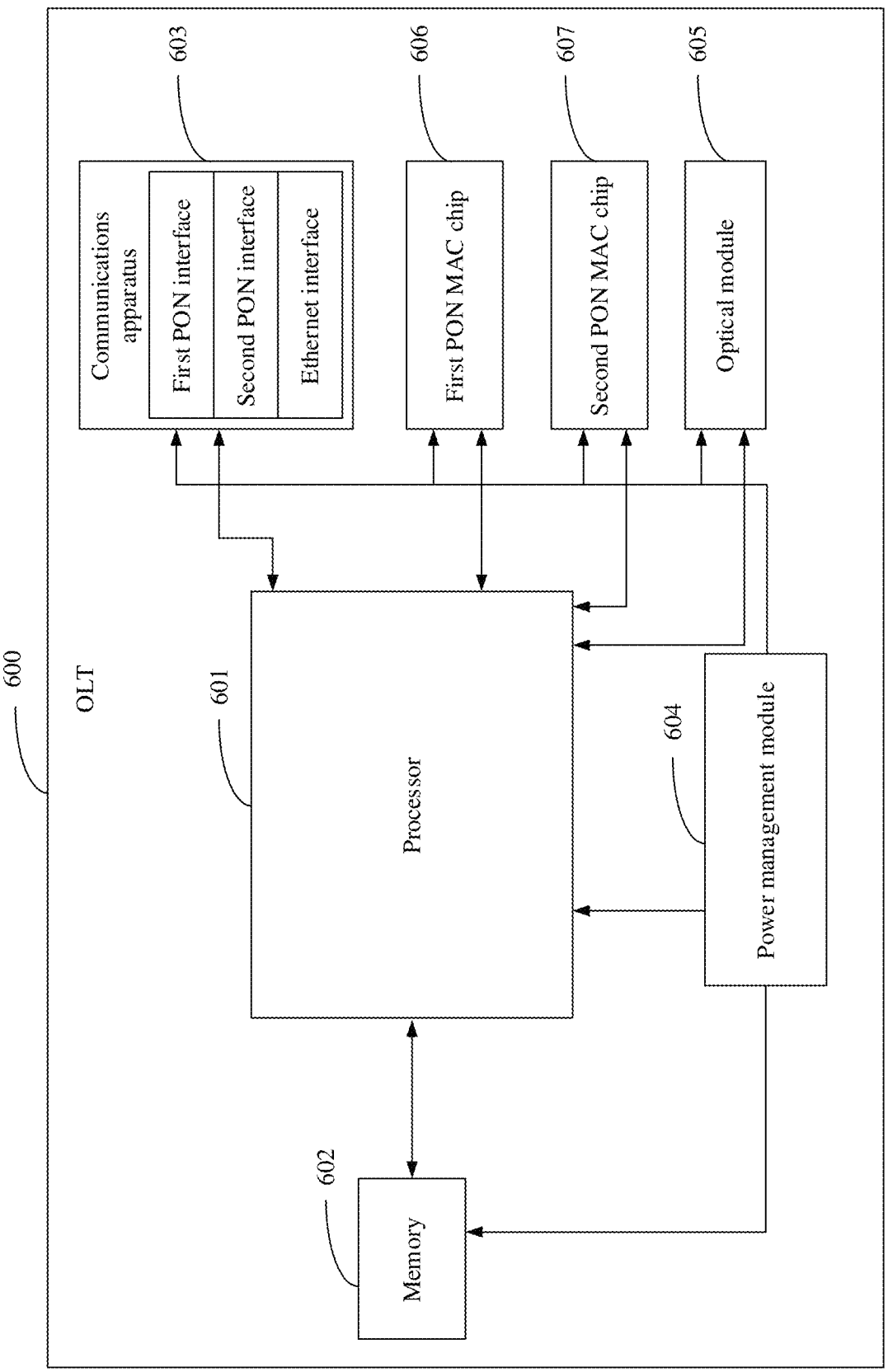
FIG. 6 is a schematic diagram of a structure of an OLT according to the embodiments.

FIG. 6 is a schematic diagram of a hardware structure of an OLT (600) according to the embodiments. As shown in FIG. 6, the OLT (600) includes the following parts: a processor 601, a memory 602, a communications apparatus 603, and a power management module 604.

The power management module 604 is configured to provide a stable current for the OLT (600).

The communications apparatus 603 may be used by the OLT (600) to communicate with another communications device, such as a network side device, another optical line terminal, or a client device. For example, in the embodiments, the network side device is a management server. A first PON interface and a second PON interface are configured in the communications apparatus 603. The first PON interface is used by the OLT (600) to perform optical communication with an upper-layer device (another upper-layer optical line terminal), and the second PON interface is used by the OLT (600) to perform optical communication with a client device. Both the first PON interface and the second PON interface are ports used for connection by using a PON (passive optical network) technology. The first PON interface may include at least one of the following: an Ethernet PON (EPON) interface, a gigabit PON (GPON) interface, a 10 gigabit Ethernet PON (10G-EPON) interface, or a future PON interface with a higher operating rate. The second PON interface may include at least one of the following: a GPON interface, an EPON interface, a symmetric 10G-GPON interface, an asymmetric 10G-GPON interface, a 10G-EPON interface, or a future PON interface with a higher operating rate.

In the embodiments, the first PON interface and the second PON interface may be PON interfaces of different types, or may be PON interfaces of a same type. The following describes functions of the modules in the OLT (600).

(1) The first PON interface and the second PON interface are PON interfaces of different types.

Optionally, the first PON interface and the second PON interface may be PON interfaces of different types. The processor 601 is configured to perform protocol conversion processing on an optical signal that is received through the first PON interface or the second PON interface, so that a processed optical signal is applicable to the second PON interface or the first PON interface. Two conversion manners are described below.

In a first manner, protocol conversion is directly performed on the optical signal. In an optional embodiment, during downlink data transmission, the processor 601 is configured to: parse, by using a protocol corresponding to the first PON interface, a first optical signal received by the first PON interface, and encapsulate a parsed first optical signal by using a protocol corresponding to the second PON interface, to complete protocol conversion of the first optical signal; and during uplink data transmission, the processor 601 is configured to: parse, by using the protocol corresponding to the second PON interface, a second optical signal received by the second PON interface, and encapsulate a parsed second optical signal by using the protocol corresponding to the first PON interface, to complete protocol conversion of the second optical signal.

In a second manner, after the optical signal is converted into an electrical signal, protocol conversion is performed on the electrical signal. In an optional embodiment, the OLT (600) may further include an optical module 605, a first PON MAC chip 606, and a second PON MAC chip 607. The first PON MAC chip 606 uses a protocol corresponding to the first PON interface, and the second PON MAC chip 607 uses a protocol corresponding to the second PON interface.

During downlink data transmission, the processor 601 is configured to: indicate the optical module 605 to convert a first optical signal received through the first PON interface into a first electrical signal, indicate the first PON MAC chip 606 to perform protocol deframing on the first electrical signal, indicate the second PON MAC chip 607 to perform protocol framing on a first electrical signal obtained after the protocol deframing, and indicate the optical module 605 to perform electrical-to-optical conversion on a first electrical signal obtained after the protocol framing, to obtain a processed first optical signal. In this way, protocol conversion of the first optical signal is completed.

During uplink data transmission, the processor 601 is configured to: indicate the optical module 605 to convert a second optical signal received through the second PON interface into a second electrical signal, indicate the second PON MAC chip 607 to perform protocol deframing on the second electrical signal, indicate the first PON MAC chip 606 to perform protocol framing on a second electrical signal obtained after the protocol deframing, and indicate the optical module 605 to perform electrical-to-optical conversion on a second electrical signal obtained after the protocol framing, to obtain a processed second optical signal. In this way, protocol conversion of the second optical signal is completed.

(2) The first PON interface and the second PON interface are PON interfaces of a same type.

When the first PON interface and the second PON interface are of a same type, the optical line terminal may perform processing such as denoising and signal enhancement on a received signal by using the processor, to improve signal transmission reliability.

Optionally, an Ethernet interface may be further configured for the communications apparatus 603. The Ethernet interface is an interface used for communication over an Ethernet protocol and may be used by the OLT (600) to communicate with an upper-layer network side device (a switch, a router, or the like).

The memory 602 is coupled to the processor 601 and is configured to store various software programs and/or a plurality of sets of instructions. For example, the memory 602 may include a high-speed random access memory, and may also include a nonvolatile memory, for example, one or more magnetic disk storage devices, flash memory devices, or other nonvolatile solid-state storage devices. The memory 602 may store an operating system (briefly referred to as a system in the following), for example, an embedded operating system such as ANDROID, IOS, WINDOWS, or LINUX. The memory 602 may further store a network communications program. The network communications program may be used to communicate with one or more optical line terminations, one or more pieces of customer-premises equipment, or one or more network side devices.

The processor 601 may be configured to read and execute computer-readable instructions, to complete a management function of the OLT (600); parse, control, or process a packet received by the OLT (600); and the like. For example, the processor 601 may be configured to invoke the program stored in the memory 602, and execute instructions included in the program. The instructions may be used to implement a signal transmission function of the OLT (600) in a PON communications network.

It may be understood that the OLT (600) may further include an upstream board, a backplane that provides a physical connection for units, a clock, a fan, a fan control module, and the like. Details are not described herein.

It should be noted that the OLT (600) shown in FIG. 6 is merely an implementation of the embodiments. In an actual application, the OLT (600) may alternatively include more or fewer components. This is not limited herein.

It should be noted that, based on the OLT hardware structure shown in FIG. 6, the OLT may be configured to perform all or some of the actions performed by the OLT in the embodiments shown in FIG. 2 and FIG. 4.

It may be clearly understood by persons of ordinary skill in the art that, for the purpose of convenient and brief description, for detailed working processes of the foregoing system, apparatus, and unit, refer to corresponding processes in the foregoing method embodiments. Details are not described herein again.

In the several embodiments provided, it should be understood that the system, apparatus, and method may be implemented in other manners. For example, the described apparatus embodiment is merely an example. For example, division into units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, that is, may be located in one position, or may be distributed on a plurality of network units. Some or all of the units may be selected based on actual requirements to achieve the objectives of the solutions of the embodiments.

In addition, functional units in the embodiments may be integrated into one processing unit, or each of the units may exist alone physically, or two or more units may be integrated into one unit. The integrated unit may be implemented in a form of hardware or may be implemented in a form of a software functional unit.

When the integrated unit is implemented in the form of a software functional unit and sold or used as an independent product, the integrated unit may be stored in a computer readable storage medium. Based on such an understanding, the solutions of the embodiments essentially, or the part contributing to the conventional technology, or all or some of the solutions may be implemented in a form of a software product. The computer software product is stored in a storage medium and includes several instructions for instructing a computer device (which may be a personal computer, a server, a network device, or the like) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing embodiments are merely intended for describing the solutions of the embodiments, but are not limiting. Although the embodiments are described in detail, persons of ordinary skill in the art should understand that they may still make modifications to the solutions described in the foregoing embodiments or make equivalent replacements to some features thereof, without departing from the spirit and scope of the solutions of the embodiments.

What is claimed is:

1. A data transmission method, comprising:
obtaining, by an optical line terminal (OLT), a data template;
obtaining, by the OLT, optical network terminal (ONT) data based on the data template;
encoding, by the OLT, the ONT data according to external data representation (XDR); and
sending, by the OLT, encoded ONT data to a management server.

2. The method according to claim 1, wherein the management server is an Internet protocol detail record (IPDR) server.

3. The method according to claim 2, further comprising:
receiving, by the OLT, cable modem (CM) data sent by a cable modem termination system (CMTS) device;
encoding, by the OLT, the CM data according to the XDR; and
sending, by the OLT, encoded CM data to the IPDR server.

4. The method according to claim 2, further comprising:
receiving, by the OLT, CM data sent by a CMTS device, wherein the CM data is encoded by the CMTS device according to the XDR; and
sending, by the OLT, the encoded CM data to the IPDR server.

5. The method according to claim 1, wherein the data template comprises at least two of a media access control (MAC) address of an ONT, an online status of the ONT, last registration time of the ONT, an identifier of an ONT service flow, a traffic template of the ONT service flow, a direction of the ONT service flow, a quantity of forwarded bytes of the ONT service flow, a quantity of forwarded packets of the ONT service flow, and a quantity of discarded packets of the ONT service flow.

6. The method according to claim 1, wherein the obtaining, by an OLT, of a data template comprises:
receiving, by the OLT, the data template sent by the management server.

7. An optical line terminal (OLT), comprising:
a processor, configured to obtain a data template, and obtain optical network terminal (ONT) data based on the data template;
an encoder, configured to encode the ONT data according to external data representation (XDR); and
a transmitter, configured to send encoded ONT data to a management server.

8. The OLT according to claim 7, wherein the management server is an Internet protocol detail record (IPDR) server.

9. The OLT according to claim 8, wherein the processor is further configured to:
Receive cable model (CM) data sent by a cable modem termination system (CMTS) device;
the encoder is further configured to:
encode the CM data according to the XDR; and
the transmitter is further configured to:
send encoded CM data to the IPDR server.

10. The OLT according to claim 8, wherein the processor is further configured to:
receive CM data sent by a CMTS device, wherein the CM data is encoded by the CMTS device according to the XDR; and
the transmitter is further configured to:
send the encoded CM data to the IPDR server.

11. The OLT according to claim 7, wherein the data template comprises at least two of a media access control (MAC) address of an ONT, an online status of the ONT, last registration time of the ONT, an identifier of an ONT service flow, a traffic template of the ONT service flow, a direction of the ONT service flow, a quantity of forwarded bytes of the ONT service flow, a quantity of forwarded packets of the ONT service flow, and a quantity of discarded packets of the ONT service flow.

12. The OLT according to claim 7, wherein the processor is configured to:
receive the data template sent by the management server.

13. A non-transitory computer readable medium, comprising instructions, wherein when the instructions are run on a computer, the computer is enabled to perform a data transmission method, wherein the transmission method comprises:
obtaining a data template;
obtaining optical network terminal (ONT) data based on the data template;
encoding the ONT data according to external data representation (XDR); and
sending encoded ONT data to a management server.

14. The non-transitory computer readable medium according to claim 13, wherein the management server is an Internet protocol detail record (IPDR) server.

15. The non-transitory computer readable medium according to claim 14, wherein the method further comprises:
receiving cable modem (CM) data sent by a cable modem termination system (CMTS) device;
encoding the CM data according to the XDR; and
sending encoded CM data to the IPDR server.

16. The non-transitory computer readable medium according to claim 14, wherein the method further comprises:
receiving CM data sent by a CMTS device, wherein the CM data is encoded by the CMTS device according to the XDR; and
sending the encoded CM data to the IPDR server.

17. The non-transitory computer readable medium according to claim 14, wherein the data template comprises at least two of a media access control (MAC) address of an ONT, an online status of the ONT, last registration time of the ONT, an identifier of an ONT service flow, a traffic template of the ONT service flow, a direction of the ONT service flow, a quantity of forwarded bytes of the ONT service flow, a quantity of forwarded packets of the ONT service flow, and a quantity of discarded packets of the ONT service flow.

18. The non-transitory computer readable medium according to claim 14, wherein the obtaining of a data template comprises:
receiving the data template sent by the management server.

* * * * *